United States Patent [19]

Rigney, II et al.

[11] Patent Number: 5,220,232
[45] Date of Patent: Jun. 15, 1993

[54] STACKED MAGNET SUPERCONDUCTING BEARING

[75] Inventors: Thomas K. Rigney, II, Torrance; Marshall P. Saville, Lawndale, both of Calif.

[73] Assignee: Allied Signal Aerospace, Morris Township, Morris County, N.J.

[21] Appl. No.: 753,760

[22] Filed: Sep. 3, 1991

[51] Int. Cl.$^5$ .............................................. H02K 7/09
[52] U.S. Cl. ................................... 310/90.5; 310/156; 505/876
[58] Field of Search ..................... 310/90.5, 112, 114, 310/156; 505/1, 876

[56] References Cited

U.S. PATENT DOCUMENTS

| 3,233,950 | 2/1966 | Baermann | 310/90.5 |
| 3,378,315 | 4/1968 | Webb | |
| 3,493,274 | 2/1970 | Emslie et al. | 310/90.5 |
| 3,614,181 | 7/1970 | Meeks | 310/90.5 |
| 3,958,842 | 5/1976 | Telle | 310/90.5 |
| 4,072,370 | 2/1978 | Wasson | |
| 4,339,874 | 7/1982 | McCarty et al. | 310/156 |
| 4,443,043 | 4/1984 | Yamaguchi | |
| 4,678,954 | 7/1987 | Takeda et al. | 310/156 |
| 4,797,386 | 1/1989 | Gyorgy et al. | 310/90.5 |
| 4,892,863 | 1/1990 | Agarwala | 310/90.5 |
| 4,939,120 | 7/1990 | Moon et al. | |
| 4,956,571 | 9/1990 | Gordon et al. | 310/90.5 |

OTHER PUBLICATIONS

An AC-Electromagnetic Bearing, Dr. Jorgen L. Nikolajsen, Texas A&M Univ.
Superconducting Meissner Effect Bearings for Cryogenic Turbomachines, Defense Technical Information Center, Creare Project 6760, TM1352, May 1989.
Superconducting Bearing and Levitation Newsletter, Cornell, Ithica N.Y. No. 1, Mar. '90, 10 pages.

Primary Examiner—Steven L. Stephan
Assistant Examiner—Matthew Nguyen
Attorney, Agent, or Firm—Hugh P. Gortler; Robert A. Walsh

[57] ABSTRACT

In a superconducting bearing, flux density and flux density gradient are increased between a magnetic source and a member of superconducting material. A plurality of magnets are magnetized end-to-end and stacked side-by-side in alternating polarity. Non-magnetic shims are disposed between the magnets. Flux lines flow between the ends of adjacent magnets and communicate with the member. Resulting is higher bearing load capacity and stiffness. When the member is made from a Type II superconducting material, the bearing provides support in both the radial and axial directions.

33 Claims, 2 Drawing Sheets

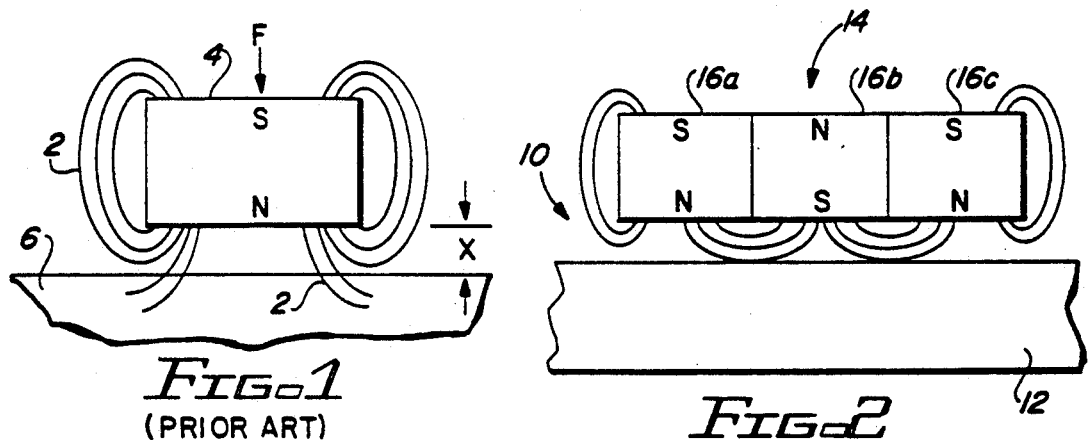
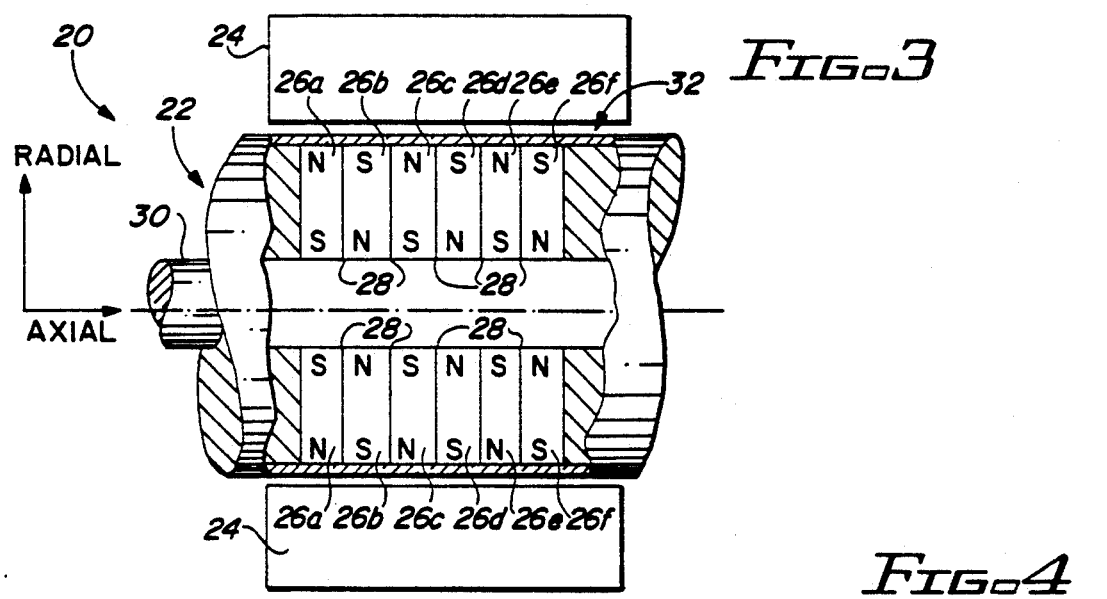
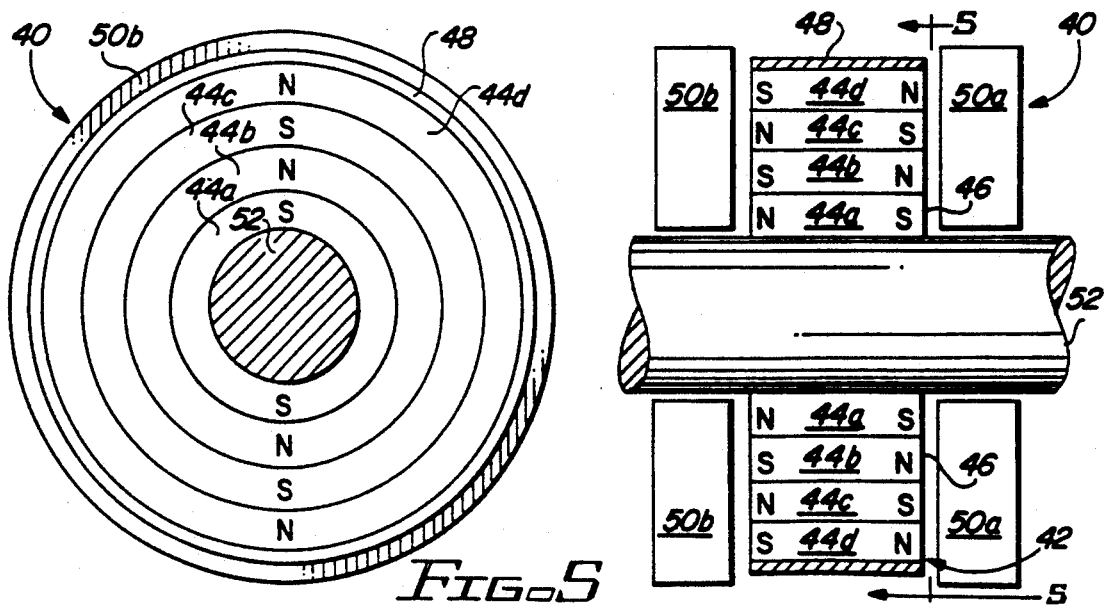

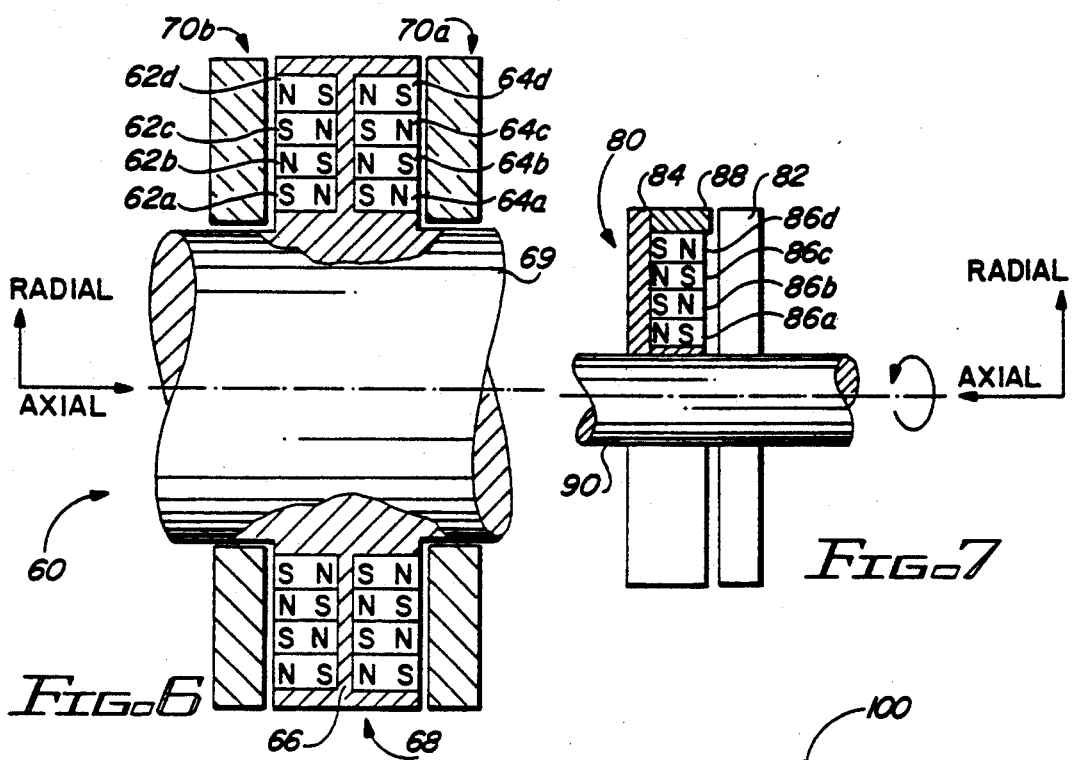
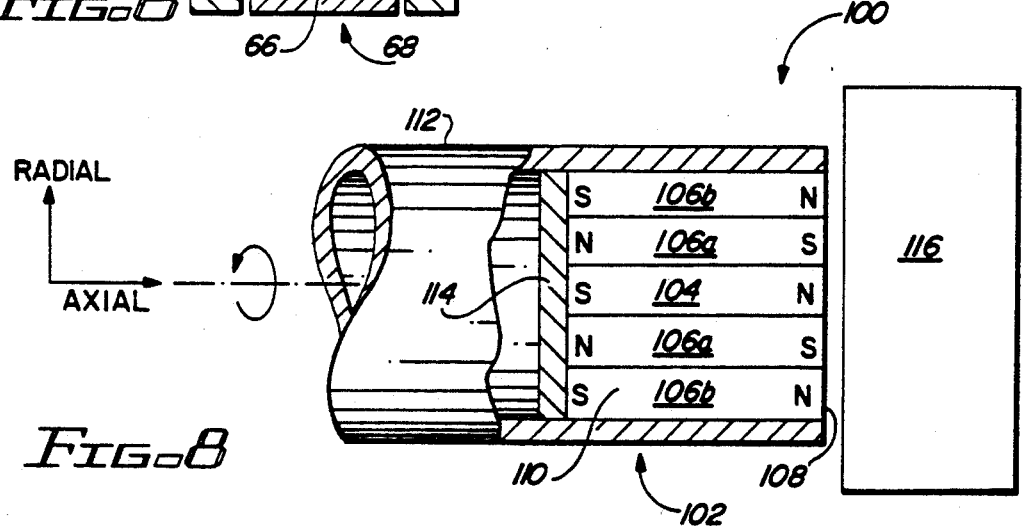
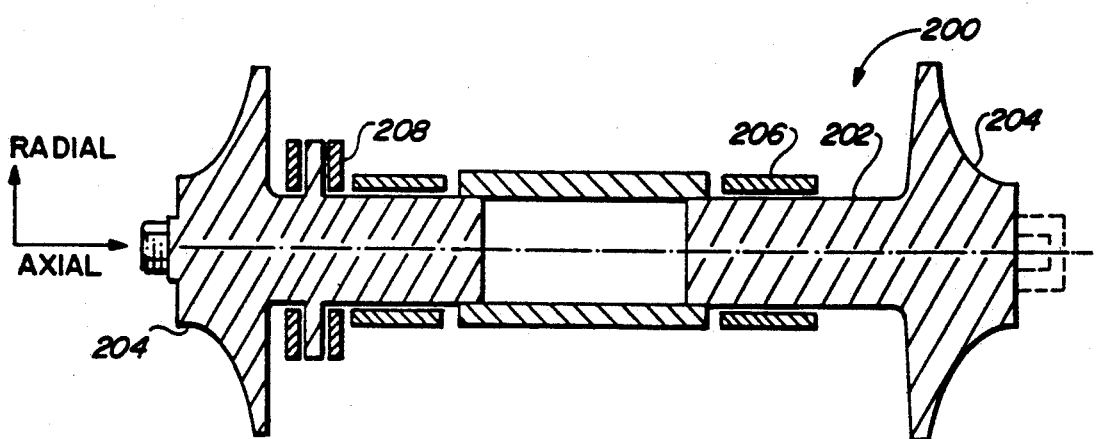

STACKED MAGNET SUPERCONDUCTING BEARING

This invention was made with government support under contract No. N00014-88-C-0668, awarded by DARPA/ONR. The government has certain rights to this invention.

FIELD OF THE INVENTION

The present invention relates in general to superconducting bearings and in particular to magnets for such bearings.

BACKGROUND OF THE INVENTION

Bearing performance is measured by bearing load capacity, stiffness and damping. Load capacity denotes rotor support limit during operation. Stiffness denotes the restoring force imparted to a shaft by the bearing when the shaft is deflected from its geometric axis. High bearing stiffness is desirable in order to maintain accurate shaft positioning as loads are applied to the shaft. Damping refers to the rate at which vibrational energy is removed from the rotating bearing-shaft system. Damping is necessary to attenuate vibration of the shaft at speeds near or at the resonant frequency of the bearing-shaft system.

Magnetic bearings can provide superior performance over mechanical bearings such as ball bearings. Magnetic bearings have low drag losses, high stiffness and damping and moderate load capacity. Unlike mechanical bearings, magnetic bearings do not have to be lubricated.

There are two types of magnetic bearings; active and passive. Active magnetic bearings are characterized by an iron rotor that is surrounded by electromagnetic coils (i.e., a stator) and positioning/sensing electronics. When the coils are energized, attractive forces between the iron rotor and coil cause the rotor to be suspended. Stiffness and damping are controlled by the electronics.

Passive magnetic bearings do not utilize electronic controls. Instead, conventional passive magnetic bearings are characterized by two sets of permanent magnets. One set of magnets is employed in the rotor, and the other set of magnets is employed in the stator. A conventional passive magnetic bearing is disclosed in U.S. Pat. No. 3,614,181 issued to Meeks on Oct. 19, 1972. Secured to a shaft are a plurality of radially-polarized magnets, which are arranged in alternating polarity. The shaft is surrounded by radially polarized ring magnets also arranged in alternating polarity. Resulting are uniform radial repulsive forces that cause the shaft to be suspended. The shaft can be rotated by a minimal amount of force. However, according to Earnshaws Theorem, total permanent magnet levitation is inherently unstable and, hence, not practical for use in bearing systems. Passive magnetic bearings have low losses and a simple design.

Passive magnetic bearings can also be made of superconducting materials. Superconductors are classified as being either Type I or Type II. When cooled below a critical temperature $T_c$, Type I and Type II superconductors have the ability to screen out all or some of the magnetic flux applied by an external source. Type I superconductors exhibit total flux expulsion for applied magnetic fields less than some critical field $H_c$ and critical temperature $T_c$. This is believed to be caused by persistent currents that flow at the surface of the Type I superconductor. The expulsion of flux from a Type I superconductor is known as the "Meissner Effect." When expelled, the flux flows around the superconductor, providing a lifting force. This lifting force causes a magnet to be levitated above a Type I superconductor that is held stationary. For applied magnetic fields above the critical field $H_c$, the superconductive properties are lost.

Type I superconducting materials are used for thrust bearings. For examples of superconducting bearings made of Type I superconductors, see U.S. Pat. No. 3,493,274 issued to Emaile et al. and U.S. Pat. No. 3,026,151 issued to Buchhold. However, magnetic bearings made of Type I superconducting materials are thought to experience rotor stability problems. In order to stabilize the rotors of these systems, the bearings generally employ either a mechanical rotor support (e.g., Buchhold) or dished structures that provide a gravitational minimum (e.g., Emaile et al.).

Type II superconductors also exhibit total flux expulsion for applied magnetic fields less than a first critical field $H_{C1}$. For applied magnetic fields in excess of a second critical field $H_{C2}$, the superconductivity is lost. In between critical fields $H_{C1}$ and $H_{C2}$, however, Type II superconductors exhibit partial flux exclusion. Partial flux exclusion is believed to be caused by inhomogeneities (e.g., pores, inclusions, grain boundaries) inside the Type II superconductor. When the magnetic field is being induced into the superconductor, the superconductor offers resistance to change or displacement of this induced magnetic field. Some of the magnetic flux lines become "pinned" within the superconducting material. This phenomenon is known as "flux-pinning." The remaining flux lines are repelled by the flux lines pinned in the superconductor. This repulsion causes levitation. Thus, levitation does not arise from the Meissner effect. Instead, levitation occurs because the superconductor behaves more like a perfect conductor than a Meissner conductor.

Type II superconducting materials are more commonly used for rotating bearings. Thrust bearings are created by levitating a magnet above a disk made of a Type II superconductor. Furthermore, journal bearings can be made by levitating a magnet inside a ring of Type II superconducting material. Due to flux pinning, a bearing made from Type II superconducting material, such as $YBa_2Cu_3O_X$, displays far greater stability than a bearing made of a Type I superconducting material. For an example of a Type II superconducting bearing, see Iannello et al., "Superconducting Meissner Effect Bearings for Cryogenic Turbomachines", Defense Technical Information Center, Alexandria, Va., no. AD-A209-875 (May 18, 1989). A cylindrical magnet is placed within a hollow shaft, which is made of a Type II superconducting material. In one embodiment, a neodymium rare-earth magnet is placed within a shaft composed of $YBa_2Cu_3O_X$ superconducting material.

The load capacity and stiffness of the superconducting bearing are dependant on the flux density and flux density gradient at the superconducting surface. Flux density is defined as the amount of magnetic flux per unit area. Flux density gradient is defined as the change of flux density over distance normal to the magnetic surface. For the prior art superconducting bearing shown in FIG. 1, flux lines 2 flow between poles of a permanent magnet 4. The magnet 4 is a distance x from a superconducting member 6, which is made of a Type II superconductor. Some of the flux lines 2 are pinned in the superconducting member 6. Flux pinning gives flux repulsion, which causes the magnet 4 to be levitated above the member 6. When an external force F is applied to the magnet 4, the magnet 4 is forced towards the member 6. As the magnet 4 is forced closer to the surface of the member 6, the resulting repulsive force (i.,e., restoring force) is increased. This increase is due to the flux density gradient. Bearing stiffness K is defined as $K = dF/dx$. Thus, as the flux density gradient is increased, the bearing becomes stiffer. Further, axial and radial load capacity is increased as the flux density between the magnets and the superconductor is increased.

Therefore, it is an object of the present invention to increase load capacity and stiffness of a superconducting bearing.

SUMMARY OF THE INVENTION

Load capacity and stiffness of a superconducting bearing are increased by increasing the flux density and flux density gradient at the surface of the superconducting material.

The superconducting bearing comprises a plurality of permanent magnets that are magnetized end-to-end and stacked side-by-side in alternating polarity, such that flux lines flow between ends of adjacent magnets. The bearing further comprises a member made of a superconducting material having at least one surface in communication with the flux lines from the magnets.

The superconducting bearing according to the present invention can be embodied as a journal/thrust bearing or a thrust/journal bearing. The journal/thrust bearing comprises a stator having a hollow cylinder made of a Type II superconducting material and a rotor disposed for rotation within the hollow cylinder. The rotor includes a plurality of annular permanent magnets magnetized in a radial direction and stacked axially in alternating polarity, and isolating means disposed between adjacent magnets. The isolating means prevent flux leakage between adjacent magnets. Lines of flux flow between said adjacent magnets. These lines communicate with the hollow cylinder. Resulting are repulsive forces that cause the rotor to be suspended within the hollow cylinder.

The thrust/journal bearing system comprises a stator including a disk made of a Type II superconducting material; and a rotor including a plurality of annular permanent magnets magnetized in an axial direction and stacked radially in alternating polarity. Isolating means are disposed between adjacent magnets to prevent flux leakage between adjacent magnets. One end of the rotor faces the disk such that flux lines flowing between adjacent magnets communicate with the disk.

BRIEF DESCRIPTION OF THE DRAWINGS

FIG. 1 is a block diagram of a superconducting bearing according to the prior art;

FIG. 2 is a block diagram of a superconducting bearing according to the present invention;

FIG. 3 is a cross-sectional view of a journal bearing according to the present invention;

FIG. 4 is a cross-sectional view of one embodiment of a thrust bearing according to the present invention;

FIG. 5 is a cross-sectional view of the thrust bearing shown in FIG. 4, taken along lines 5-5 and looking in the direction of the arrows;

FIGS. 6-8 are cross-sectional views of alternate embodiments of thrust bearings according to the present invention; and FIG. 9 is a schematic diagram of a bearing-shaft system in accordance with the present invention.

DETAILED DESCRIPTION OF THE PREFERRED EMBODIMENT

Referring to FIG. 2, there is shown a block diagram of a superconducting bearing 10 in accordance with the present invention. The bearing 10 includes a superconducting member 12 made of a superconducting material and a laminate structure 14 made of first, second and third permanent magnets 16a, 16b and 16c. One surface of the laminate structure 14 faces the superconducting member 12. The magnets 16a, 16b and 16c are arranged in alternating polarity. Thus, the north poles of the first and third magnets 16a and 16b and the south pole of the second magnet 16b face the superconducting member 12. As with the prior art bearing, flux lines flow between the north and south poles of the end (i.e. first and third) magnets 16a and 16c. Further, this arrangement allows magnetic flux lines to flow between poles of adjacent magnets. Thus, one set of flux lines flows between the first and second magnets 16a and 16b and a second set of flux lines flows between the second and third magnets 16b and 16c. By laminating the magnets 16a, 16b and 16c in this manner, the number of flux lines per unit area is increased. As a result, flux density is increased between North and South poles at the one surface of the laminate structure 16b and 16c. Further, the lengths of the flux lines are shortened. As a result, the flux density gradient is increased.

The superconducting member 12 can be made of either Type I or Type II superconducting material. Due to the superior stability caused by flux pinning, however, Type II superconducting material is preferred.

Referring now to FIG. 3, there is shown a journal bearing 20 in accordance with the present invention. The journal bearing 20 includes a rotor 22 and a hollow cylinder 24, which functions as a stator. The cylinder 24 is made of a Type II superconductor such as $YBa_2Cu_3O_x$. Although the cylinder 24 can be made from a Type I superconductor, the Type II superconductor is preferred.

The rotor 22 is a laminate structure that includes a plurality of annular magnets 26a-26f. Each annular magnet 26a-26f is a rare earth magnet, such as samarium-cobalt magnet or neodymium-iron-boron magnet. The annular magnets 26a-26f are magnetized in a radial direction and are stacked side-by-side in alternating polarity. Thus, the outer poles of magnets 26a-26f are North, South, North, South, North and South, respectively. Non-magnetic shims 28 are placed between the magnets 26a-26f. The shims 28 reduce flux leakage between adjacent magnets by increasing the magnetic reluctance between the adjacent magnets. The shims 28 are made of non-ferrous materials having low thermal distortion. Such materials include non-magnetic stainless steel and titanium. A tie rod 30 extends through the longitudinal axes of the annular magnets 26a-26f. The tie rod 30 is made of a material having a high coefficient of permeability. For low speed applications, the annular magnets 26a-26f can be attached to the tie rod 30 by epoxy. For high speed applications, however, the annular magnets 26a-26f are attached to the tie rod 30 by bolting the ends of the tie rod 30 such that the annular magnets 26a-26f and shims 28 are pressed together. The number and width of annular magnets 26a-26f depends upon the bearing load capacity and stiffness requirements. Thinner magnets 26a-26f produce higher flux density gradients which result in higher bearing stiffness. It should be noted that magnet manufacturing limitations limit thickness of the annular magnets 26a-26f. Such limitations include the ability to align the grains and magnetize the magnets in the radial direction.

The rotor 22 is located within the hollow cylinder 24. The magnet-to-superconductor clearances must be low in order to take advantage of the higher flux density and flux gradient.

During operation, the cylinder 24 is cooled to a temperature below its critical temperature $T_c$ (93 degrees Kelvin for $YBa_2Cu_3O_x$). As the operating temperature is decreased below the critical temperature $T_c$, the load capacity and stiffness of the bearing 20 is increased dramatically. See Weinberger, B. R. et al., *Supercond. Sci. Technol.*, Vol 3, p. 381 (1990). Liquid nitrogen cools the cylinder 24 to a temperature of 77 degrees Kelvin. The resulting flux-pinning causes the rotor 22 to be suspended within the cylinder 24. The translation of the rotor 22 in either the axial or radial direction results in a change in the distribution of the flux pinned inside the cylinder 24. However, the Type II superconducting material resists such change. Therefore, the rotor 22 exhibits a resistance to forces applied both radially and axially. Thus, the journal bearing 20 can also act as a thrust bearing that supports radial and axial loads. It should be noted, however, that the bearing 20 provides only nominal resistance in the axial direction.

Although the rotor 22 offers resistance to axial and radial translation, it offers very low resistance to rotation. The magnetic field that is pinned within the cylinder 24 is nearly symmetrical and constant for any angular position of the rotor 22. Rotation of the rotor 22 about its longitudinal axis does not alter the magnetic flux that is pinned within the cylinder 24. Thus, the cylinder 24 can be made to spin on its longitudinal axis with very little force.

In FIG. 3, a retaining sleeve 32 is employed to hold the magnets 26a-26f in the rotor 22. Although the highest bearing stiffness and capacity is achieved without the retaining sleeve 32, the stresses in the tie rod 30 resulting from high rotational speeds may necessitate its use. The retaining sleeve 32 can be made of a non-ferrous, high strength metal such as beryllium copper or inconel 718. Alternately, the retaining sleeve 32 can be made of high strength fibers such as filament-wound graphite or Kevlar. The clearance and minimum magnet width is limited by the thickness of the retaining sleeve in order to achieve maximum flux density at the superconductor surface of the hollow cylinder 24.

When damping is desired, beryllium copper is the material of choice for the retaining sleeve 32. The beryllium copper sleeve 32 improves bearing damping through hysteresis at the expense of higher bearing drag. Relative motion between the retaining sleeve 32 and the cylinder 2 creates eddy currents within the sleeve 32. The creation of these eddy currents removes energy from the rotor 22. Through the removal of energy, damping occurs. Although a metal such as silver removes energy at a higher rate than beryllium copper, the silver is not as strong as beryllium copper. Therefore, beryllium copper is preferred over silver.

FIGS. 4-8 show various embodiments of thrust bearings in accordance with the present invention. These thrust bearings operate according to the same principle discussed in connection with FIGS. 2 and 3.

FIGS. 4 and 5 show a double-acting thrust bearing 40. This bearing 40 has a rotor 42 that includes annular rare earth magnets 44a-44d that are magnetized in the axial direction. The annular magnets 44a-44d are stacked concentrically. Further, the magnets 44a-44d are stacked in alternating polarity. Thus, the North pole of the innermost magnet 44a, South pole of magnet 44b, North pole of magnet 44c and South pole of magnet 44d are disposed on one side of the rotor 42. And, the South pole of the innermost magnet 44a, North pole of magnet 44b, South pole of magnet 44c and North pole of magnet 44d are disposed on the opposite side of the rotor 42. Non-magnetic shims 46 are disposed between the annular magnets 44a-44b. When employed for high speed applications, the bearing 40 also includes a retaining sleeve 48 for holding the magnets 44a-44d in place. Two disks 50a and 50b of Type II superconducting material are disposed on opposite sides of the rotor 42. A shaft 52 extends through the longitudinal axes of the disks 50a and 50b and the innermost magnet 44a. The innermost magnet 44a is attached to the shaft 52 by means such as a clearance fit with epoxy or a press-fit. Magnetic flux lines flowing between the poles of adjacent magnets interact with the disks 50a and 50b to define bearing load capacity and stiffness. The bearing 40 can take heavy loads in the axial direction and light loads in the radial direction.

FIG. 6 shows another embodiment of a double-acting thrust bearing 60. This bearing 60 is similar to the bearing shown 40 in FIGS. 4 and 5, except that two sets of concentric annular magnets 62a-62d and 64a-64d are disposed on opposite side of a retaining wall 66. The retaining wall 66, made of a metal having a high coefficient of permeability, closes the flux paths between the two sets of magnets 62a-62d and 64a-64d. A retaining sleeve 68 can be formed integrally with the retaining wall 66 or affixed thereto.

FIG. 7 shows a single-acting thrust bearing 80. This bearing 80 is similar to the double-acting bearing 40 shown in FIGS. 4 and 5, except that only one disk 82 of superconducting material is provided. The disk 82 and a retaining wall 84 are disposed on opposite sides of the concentric annular magnets 86a-86d. The retaining wall 86, made of a material having a high coefficient of permeability, closes the flux paths between the concentric annular magnets 86a-86d. A retaining sleeve 88 can be formed integrally with the retaining wall 84 or affixed thereto.

FIG. 8 shows yet another embodiment of a thrust bearing 100 according to the present invention. The rotor 102 includes a cylindrical rare earth magnet 104 that is surrounded by concentric annular rare earth magnets 106a and 106b. The cylindrical magnet 104 and annular magnets 106a and 106b are magnetized in the axial direction. Further, the magnets 104, 106a and 106b are stacked in alternating polarity. Thus, at a first end 108 of the rotor 102, the polarity of the cylindrical magnet 104 is North, the polarity of the adjacent annular magnet 106a is South and the polarity of the outermost magnet 106b is North. Non-magnetic shims 110 are disposed between the magnets 104 and 106a and 106b. A second end of the rotor 102 is inserted into the hollow of a shaft 112. The rotor 102 abuts against a retaining wall 114, which is made of a material having a high coefficient of permeability. The retaining wall 114 closes the flux paths between the magnets 104, 106a and 106b. A disk 116 of Type II superconducting material is disposed opposite the first end 108 of the rotor 102. The disk 116 functions as a stator. Magnetic flux lines flowing between the poles of adjacent magnets interact with the disk 116 to define bearing load capacity and stiffness. The bearing 100 can take heavy loads in the axial direction and light loads in the radial direction.

The thrust bearings 40, 60, 80 and 100 can be made with a Type I superconducting material. However, a Type II superconducting material is preferred. The Type II superconducting material enables the thrust bearings 40, 60, 80 and 100 to handle heavy loads in the axial direction and light loads in the radial direction. Thus, the thrust bearings 40, 60, 80 and 100 also function as journal bearings. Further, the thrust bearings 40, 60, 80 and 100 are easier to manufacture than the journal bearing 10. First, it is easier to magnetize grains in the axial direction than in the radial direction. Second, grains aligned in the axial direction are commercially available, whereas grains aligned in t he radial direction are not.

Referring to FIG. 9, there is shown a shaft-journal system 200. A pair of turbines 204 rotate shaft 202. Journal bearings 206 support the radial load of the shaft 202 and thrust bearings 208 support the axial load of the shaft 202. The journal and thrust bearings 206 and 208 can also be adapted to support the shafts of other turbomachinery, such as compressors, pumps and flow meters. The bearing load capacity, stiffness and damping are designed according to the application.

It will be understood that the embodiments described herein are merely exemplary and that a person skilled in the art may make many variations and modifications without departing from the spirit and scope of the invention. For example, the stator can comprise the laminated magnets and the rotor can comprise a layer of superconducting material. If necessary, the retaining sleeve would be employed to hold the superconducting material onto the rotor. All such modifications are intended to be included within the scope of the invention as defined in the appended claims.

What is claimed is:

1. A superconducting bearing, comprising:
    a plurality of permanent magnets magnetized end-to-end and stacked side-by-side in alternating polarity, such that flux lines flow between ends of adjacent magnets;
    isolating means, disposed between said adjacent magnets, for reducing flux leakage between opposing sides of said adjacent magnets; and
    a member made of superconducting material having at least one surface in communication with said flux lines.

2. A superconducting bearing according to claim 1, wherein each magnet is a rare earth magnet.

3. A superconducting bearing according to claim 1, wherein said isolating means includes at least one non-magnetic shim.

4. A superconducting bearing according to claim 1, wherein said member is made of Type II superconducting material.

5. A superconducting bearing according to claim 4, wherein said member is a rotor and wherein said plurality of magnets is a stator.

6. A superconducting bearing according to claim 4, wherein said member is a stator and wherein said plurality of magnets is a rotor.

7. A superconducting bearing according to claim 6, wherein said member is a hollow cylinder, wherein each magnet is an annular magnet magnetized in a radial direction, and wherein said plurality of magnets are stacked axially and disposed within said cylinder.

8. A superconducting bearing according to claim 7, further comprising retaining means, attached to said surface of said plurality of magnets, for retaining said plurality of magnets.

9. A superconducting bearing according to claim 8, wherein said retaining means concludes a sleeve made of a non-metal.

10. A superconducting bearing according to claim 8, wherein said retaining means concludes a sleeve made of a non-ferrous metal.

11. A superconducting bearing according to claim 10, wherein said metal sleeve is made of beryllium copper.

12. A superconducting bearing according to claim 7, further comprising attaching means for attaching said plurality of magnets to a shaft.

13. A superconducting bearing according to claim 12, wherein said attaching means includes a tie rod made of a material having a high coefficient of permeability, said plurality of magnets being epoxied to said tie rod, said tie rod being coupled to said shaft.

14. A superconducting bearing according to claim 12, wherein said attaching means includes a tie rod made of a material having a high coefficient of permeability, said plurality of magnets being clamped together by said tie rod, said tie rod being coupled to said shaft.

15. A superconducting bearing according to claim 6, wherein each magnet is an annular magnet magnetized in an axial direction, wherein said plurality of magnets are stacked concentrically, and wherein said member is a disk facing first ends of said magnets.

16. A superconducting bearing according to claim 15, further comprising a retaining wall made of a material having a high coefficient of permeability, said retaining wall being attached to second ends of said magnets.

17. A superconducting bearing according to claim 16, wherein said plurality of magnets is attached to a shaft having an internal hollow at one end, and wherein said retaining wall is disposed within said hollow such that said first ends of said magnets communicate with said disk.

18. A superconducting bearing according to claim 17, wherein said plurality of magnets further includes a cylindrical magnet magnetized axially and attached coaxially to an innermost annular magnet of said plurality, at least one shim being disposed between said cylindrical magnet and said innermost annular magnet.

19. A superconducting bearing according to claim 16, wherein a shaft is coaxially attached to an innermost annular magnet of said plurality.

20. A superconducting bearing according to claim 18, further comprising retaining means, attached to an outermost magnet of said plurality, for retaining said magnets.

21. A superconducting bearing according to claim 20, wherein said retaining means concludes a metal sleeve.

22. A superconducting bearing according to claim 21, wherein said metal sleeve is made of beryllium copper.

23. A superconducting bearing according to claim 19, further comprising a second plurality of annular magnets that are magnetized axially and stacked concentrically in alternating polarity, with non-magnetic shims being disposed between adjacent magnets, first ends of said second plurality being attached to said retaining wall; and a second disk made of Type II superconducting material facing second ends of said second plurality, wherein said shaft is attached coaxially to an innermost annular magnet of said second plurality.

24. A superconducting bearing according to claim 23, comprising retaining means, attached to outermost magnets of said plurality and said second plurality of magnets, respectively, for retaining said magnets.

25. A superconducting bearing according to claim 24, wherein said retaining means includes a metal sleeve for each plurality of magnets.

26. A superconducting bearing according to claim 25, wherein said metal sleeve is made of beryllium copper.

27. A superconducting bearing according to claim 15, further comprising a second disk facing second ends of said plurality of magnets, said second disk being made of a Type II superconducting material.

28. A superconducting bearing according to claim 27, further comprising retaining means, attached to an outermost magnet of said plurality, for retaining said plurality of magnets.

29. A superconducting bearing according to claim 28, wherein said retaining means concludes a metal sleeve.

30. A superconducting bearing according to claim 29, wherein said metal sleeve is made of beryllium copper.

31. A journal/thrust bearing comprising:
a stator including a hollow cylinder made of a Type II superconducting material; and
a rotor, disposed for rotation within said hollow cylinder, including a plurality of annular permanent magnets magnetized in a radial direction and stacked axially in alternating polarity, and isolating means, disposed between adjacent magnets, for preventing flux leakage between said adjacent magnets, wherein lines of flux flow between said adjacent magnets and communicate with said hollow cylinder.

32. A thrust/journal bearing comprising:
a stator including a disk made of a Type II superconducting material; and
a rotor including a plurality of annular permanent magnets magnetized in an axial direction and stacked radially in alternating polarity, and isolating means, disposed between adjacent magnets, for preventing flux leakage between said adjacent magnets, wherein one end of said rotor faces said disk such that flux lines flowing between said adjacent magnets communicate with said disk.

33. A shaft-bearing system, including a shaft and at least one journal bearing attached to said shaft, each journal bearing comprising:
a plurality of annular permanent magnets magnetized in a radial direction and stacked axially in alternating polarity, said plurality of magnets being coupled to said shaft, whereby lines of flux flow between adjacent magnets;
isolating means, disposed between said adjacent magnets, for preventing flux leakage between said adjacent magnets; and
a hollow cylinder, made of a Type II superconducting surrounding said annular magnets such that said lines of flux communicate with said cylinder.

* * * * *